United States Patent [19]

Tsukiji et al.

[11] Patent Number: 5,038,491
[45] Date of Patent: Aug. 13, 1991

[54] SCALE FOR USE FOR MEASUREMENT OF THE DISPLACEMENT OF AN OBJECT TO BE EXAMINED, AND DISPLACEMENT MEASURING APPARATUS

[75] Inventors: Masaaki Tsukiji, Tokyo; Tetsuharu Nishimura, Kawasaki; Satoshi Ishii, Tokyo; Koh Ishizuka, Urawa, all of Japan

[73] Assignee: Canon Kabushiki Kaisha, Tokyo, Japan

[21] Appl. No.: 369,862

[22] Filed: Jun. 22, 1989

[30] Foreign Application Priority Data

Jul. 1, 1988 [JP] Japan ................... 63-164144

[51] Int. Cl.⁵ .............................................. G01B 3/04
[52] U.S. Cl. ........................................ 33/702; 33/707
[58] Field of Search ................. 33/702, 706, 707, 708

[56] References Cited

U.S. PATENT DOCUMENTS

| 4,587,622 | 5/1986 | Herzog | 364/561 |
| 4,628,609 | 12/1986 | Rieder et al. | 33/702 |
| 4,777,728 | 10/1988 | Ludicke | 33/702 |

Primary Examiner—Harry N. Haroian
Attorney, Agent, or Firm—Fitzpatrick, Cella, Harper & Scinto

[57] ABSTRACT

A scale, for measuring the displacement of an object to be examined, has a division and a mark for alignment of the division, and a displacement measuring apparatus, for measuring the displacement of a scale, has a device for reading the division of the scale and a detector for detecting the positional error of the division relative to the direction of the displacement.

6 Claims, 3 Drawing Sheets

SCALE FOR USE FOR MEASUREMENT OF THE DISPLACEMENT OF AN OBJECT TO BE EXAMINED, AND DISPLACEMENT MEASURING APPARATUS

BACKGROUND OF THE INVENTION

1. Field of the Invention

This invention relates to a scale for use for measurement of the displacement of an object to be examined and to a displacement measuring apparatus. More particularly, the invention relates to a scale and a measuring apparatus which display their effects when it is desired to highly accurately measure the displacement of an object to be examined to obtain, for example, the amount of movement and the speed of movement of such object.

2. Related Background Art

Heretofore, a linear encoder has often been used for the detection of the position and amount of movement of an object to be measured such as an X-Y stage. Particularly, optical type linear encoders have been used in various fields because of their ability to accomplish highly accurate measurement of displacement.

FIG. 1 of the accompanying drawings schematically shows the construction of an optical type linear encoder according to the prior art. In FIG. 1, the reference numeral 61 designates a scale provided with a division 61a. The reference numeral 68 denotes detecting means provided therein with a light-emitting element and a light receiving sensor for receiving the light from the division 61a and reading the division 61a. The reference numeral 69 designates an object which is a movable stage movable in a predetermined direction as indicated by arrow A. The scale 61 is attached to the movable stage 69, and is moved with the movement of the movable stage 69 relative to the detecting means 68 fixed to a base plate, not shown.

The linear encoder shown in FIG. 1 detects the displacement of the division 61a on the scale 61 resulting from the movement of the movable stage 69, by the detecting means 68, thereby detecting the amount of displacement of the movable stage 69.

The division 61a comprises light-transmitting portions and light-intercepting portions both having a slit-like shape, and these portions are alternately arranged at a predetermined pitch in a direction orthogonal to the lengthwise direction of the slit (the widthwise direction). The light from the aforementioned light-emitting element irradiates an area including several light-transmitting portions and light-intercepting portions, and the aforementioned light receiving sensor photoelectrically converts the light passed through the light-transmitting portions.

FIG. 2 of the accompanying drawings is an illustration showing a state in which the direction of movement A of the movable stage 69 and the direction of arrangement of the portions of the division 61a of the scale 61 are not coincident with each other but are inclined, and FIG. 3 of the accompanying drawings is an enlarged view showing the state of the division 61a of the scale 61 in the state shown in FIG. 2.

If as shown in FIGS. 2 and 3, the direction of movement A of the movable stage 69 and the direction of arrangement B of the portions of the division 61a of the scale 61 are not coincident with each other, the output signal from the detecting means 18 will be as follows:

$$\epsilon = L2 - L1$$

$$L1 = L2 \cos \theta$$

$$\epsilon = L2(1 - \cos \theta)$$

where $\eta$ is the angle formed between the direction A and the direction B, L1 is the read value of the division 61a of the scale 61 when the movable stage 69 is displaced, L2 is the actual amount of movement of the movable stage 69, and $\epsilon$ is the difference between L1 and L2.

Accordingly, assuming that L2 = 100 mm and $\theta = 0.08°$, there occurs an error of $\epsilon = 0.1$ μm, and simply because the division is inclined by only 0.08° with respect to the direction of movement of the object to be examined, accurate measurement in the unit of submicron becomes impossible.

SUMMARY OF THE INVENTION

The present invention has been made in view of the above-noted problem peculiar to the prior art and the object thereof is to provide a scale and an apparatus which can accomplish highly accurate measurement of displacement.

To achieve this object, the scale of the present invention is for measuring the displacement of an object to be examined and is characterized by a division and a mark for alignment of said division, and the apparatus of the present invention is for measuring the displacement of the scale and is characterized by means for reading the division of the scale and means for detecting the positional error of said division relative to the direction of said displacement.

The apparatus of the present invention has positional deviation detecting means and can therefore be adjusted so as to correct the detected positional error. This adjustment includes adjusting the position of the scale, or correcting the signal from the reading means so that said positional error may not affect the result of measurement. Also, by using the scale of the present invention as a scale, positional deviation can be detected accurately.

Further features and specific forms of the present invention will appear in detail in the following description of some embodiment thereof.

DESCRIPTION OF THE PREFERRED EMBODIMENTS

Figure 1:
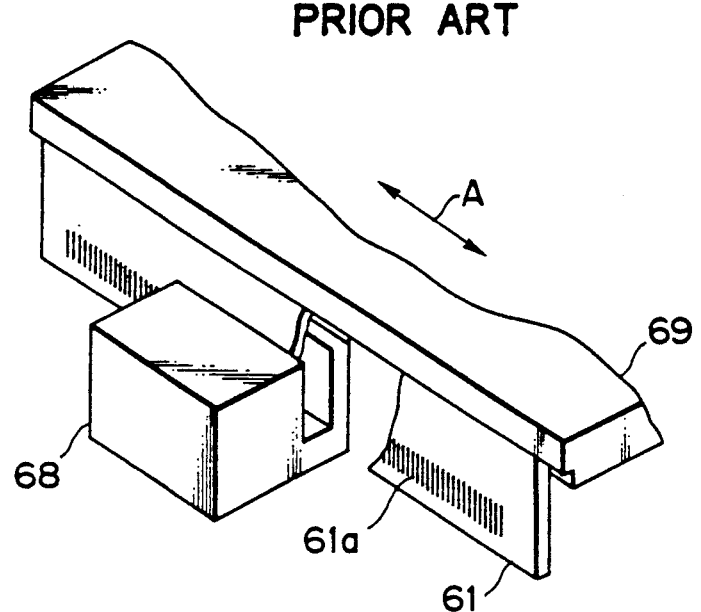
FIG. 1 schematically shows the construction of an optical type linear encoder according to the prior art.
Figure 2:
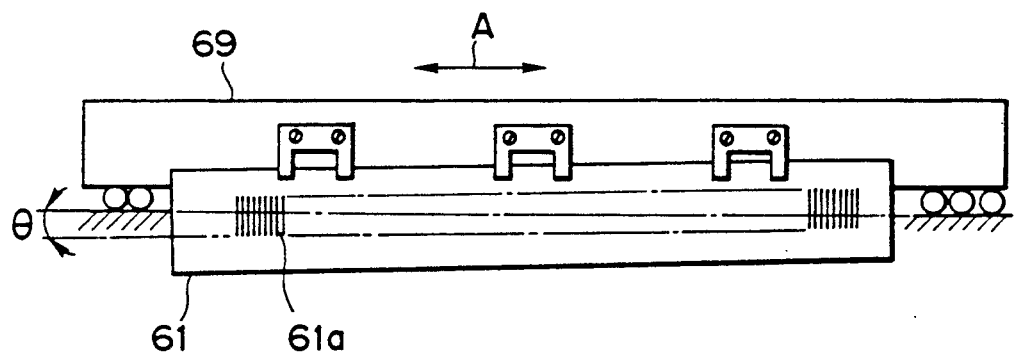
FIG. 2 is an illustration showing a state in which the direction of movement of a movable stage and the division of a scale are inclined relative to each other.
Figure 4:
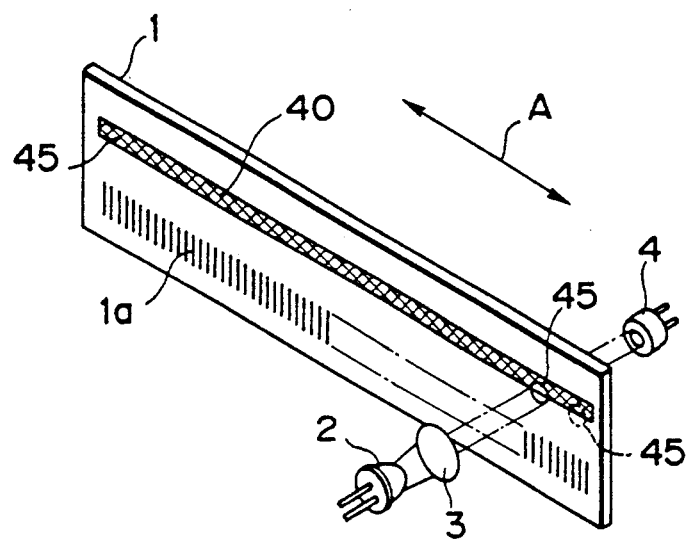
FIG. 4 is a schematic view showing an embodiment of the present invention.

Referring to FIG. 4 which is a schematic view showing an embodiment of the present invention, the reference numeral 1 designates the scale of the present invention which has a division and a mark for alignment of the division formed on a transparent base plate. The scale 1 is attached to a movable stage as shown in FIG. 1. Denoted by 1a is a division similar to the division 61a of FIG. 1, and the division 1a comprises light-transmitting portions and light-intercepting portions arranged along a predetermined direction. The reference numeral 40 designates a straight mark for alignment, and this mark is provided so that the lengthwise edge thereof is parallel to the direction of arrangement of the portions of the division 1a (said predetermined direction). The mark 40 is formed on the surface of the scale 1 with a reflecting film or a light-intercepting film provided thereon, and is designed such that a light irradiating the mark does not pass through the mark. The reference numeral 2 denotes a light-emitting element comprising an LED, and the reference numeral 3 designates a condensing lens for condensing the light beam from the lightemitting element 2 and forming a light spot on the scale 1 so as to illuminate the mark 40 by part by the light beam. The reference numeral 4 denotes a light receiving element for receiving the part of the light beam from the light-emitting element 2 which has passed through the upper or lower transparent portion of the mark 40.

The light-emitting element 2, the condensing lens 3 and the light receiving element 4 function as detecting means for detecting any positional deviation of the division, and these are integrated and contained in a case, not shown. The division 1a is read by the detecting means 68 described with reference to FIG. 1.

Figure 3:
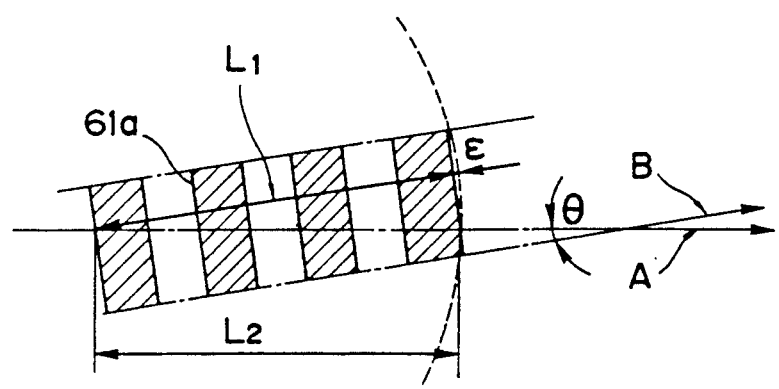
FIG. 3 is an enlarged view showing the state of the division in the state shown in FIG. 2.

In the present embodiment, the light beam from the light-emitting element 2 is caused to enter the scale 1 by the condensing lens 3. The light beam passed through the marginal transparent portion of the mark 40 is received by the light receiving element 4. The shape of the mark 40 provided on the scale 1 and the shape of the light spot formed on the scale 1 are determined so that when the movable stage which is an object to be examined is moved and thereby displaced from end to end, at least the quantities of light entering the light receiving element 4 at the opposite ends of the mark 40 become equal when the direction of movement A of the movable stage and the direction of arrangement of the portions of the division la of the scale 1 (the direction B in FIG. 3) coincide with each other.

Specifically, design is made such that when the light spot 45 illuminates the vicinity of the end portions of the mark 40, one half of the light spot (substantially circular) is intercepted by the mark 40 and the other half of the light spot passes through the scale 1 and is received by the light receiving element 4, and the lengthwise edges of the mark 40 are parallel to each other and the width of the mark 40 does not vary from end to end and therefore, if the mark 40 is not inclined with respect to the direction of movement A of the scale 1, the quantity of light received by the light receiving element 4 is constant even if the scale 1 is displaced in the direction A as previously described.

On the other hand, if the direction of arrangement of the portions of the division 1a is inclined with respect to the direction of movement A of the scale 1 (the two directions are not coincident) and the edges of the mark 40 are inclined with respect to the direction of movement A, the quantity of light received by the light receiving element 4 varies gradually in conformity with the displacement of the scale 1 in the direction A. Accordingly, the level of the output signal from the light receiving element 4 varies gradually.

Thus, in the present embodiment, before the displacement of the scale 1 (the movable stage) is detected, the position of the scale 1 is adjusted while the output signal from the light receiving element 4 is monitored by the use of the detecting means (2, 3, 4) and the mark 40 so that the quantity of light passed through the vicinity of the mark 40 on the scale and entering the light receiving element 4 may not vary with the movement of the scale 1, whereby the direction of movement of the scale 1 (the movable stage) and the direction of arrangement of the portions of the division 1a of the scale 1 are made coincident with each other.

By the direction of arrangement of the portions of the division 1a of the scale 1 and the direction of movement of the scale 1 being thus made coincident with each other, the signal obtained when the division 1a is read by detecting means, not shown, exactly corresponds to the amount of movement of the scale 1. Consequently, the displacement of the scale 1, i.e., the object to be examined, can be measured very accurately.

In the present embodiment, the detecting means (2, 3, 4) is designed such that the light transmitted through the scale 1 is received by the light receiving element 4, but alternatively, the light receiving element 4 may be installed on the same side as the light-emitting element 2 with respect to the scale 1 and the reflected light from the mark 40 may be received by the light receiving element 4.

Also, the division la of the scale 1 in the present embodiment, like the division 61a shown in FIG. 1, is comprised of slit-like light-transmitting portions and light-intercepting portions alternately arranged, but alternatively, may be comprised of slit-like light-transmitting portions and reflecting portions alternately arranged. To increase the resolving power of the scale and of the apparatus, a diffraction grating is used as the division 1a. The available forms of this diffraction grating include various forms such as a construction in which the above-described slitlike portions are arranged at a very small pitch, a hologram and a relief type grating in which grooves are periodically arranged on a transparent substrate. Such diffraction grating is illuminated by light and several diffracted lights created by the diffraction grating are caused to interfere with one another to thereby form an interference fringe, which is photoelectrically converted to thereby obtain a signal conforming to the displacement of the scale. Various detecting means for reading this diffraction grating have heretofore been proposed and are well known to those skilled in the art and therefore need not be described in detail herein, but it should be noted that the present invention is suitable for a displacement measuring apparatus having a high resolving power of this type.

Figure 5:
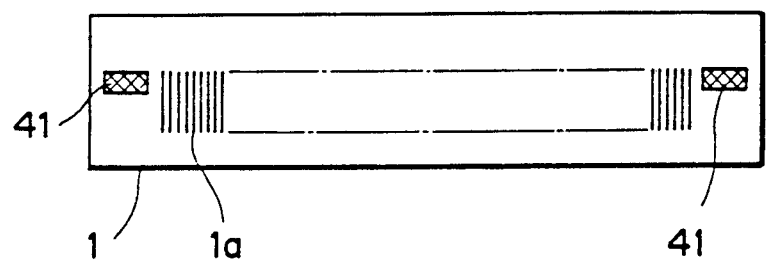
FIG. 5 is a schematic view showing a modification of the FIG. 4 embodiment.

FIG. 5 shows a modification of the mark 40 provided on the scale 1 of the embodiment shown in FIG. 4. In FIG. 5, the reference numeral 41 designates marks for alignment. Instead of the mark 40 being provided so as to cover the whole range of the division 1a of the scale 1 as in the embodiment shown in FIG. 4, the marks 41 are provided at locations adjacent to the opposite ends of the division 1a of the scale 1. The marks 41 of the present embodiment each comprise a rectangular reflecting film, and the lengthwise direction of the marks 41 coincides with the direction of arrangement of the portions (the light-transmitting portions and the light-intercepting portions) of the division 1a. That is, the marks 41 are formed so that the center lines (the phantom lines) of the marks 41 widthwisely bisecting the marks 41 which correspond to the lengthwise direction of the marks 41 coincide with each other. As in the embodiment shown in FIG. 4, the position of the scale 1 is adjusted so that the quantities of light passed through the transparent portions near the marks 41 at the opposite ends and entering the light receiving element 4 become equal, whereby the direction of movement A of the scale 1 (the movable stage) and the direction of arrangement B of the portions of the division 1a are made coincident with each other.

Figure 6:
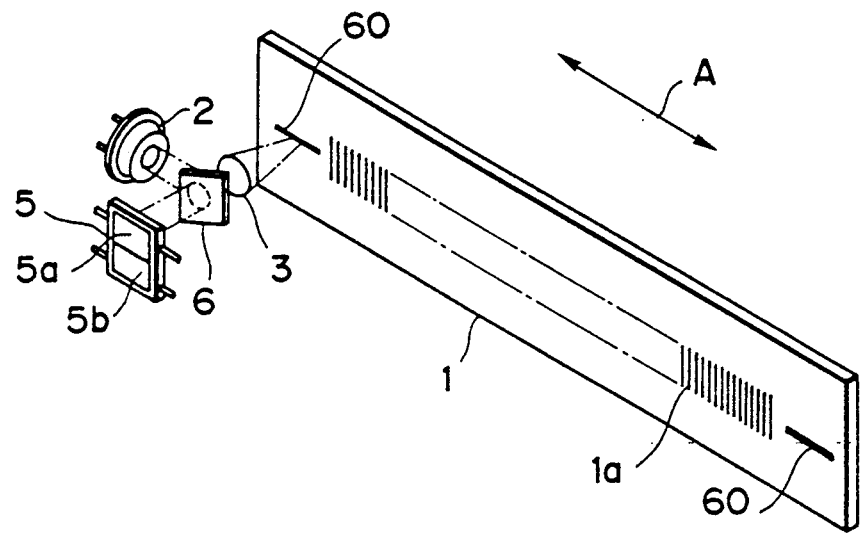
FIG. 6 is a schematic view showing another embodiment of the present invention.

FIG. 6 is a schematic view showing another embodiment of the present invention. In FIG. 6, the reference numeral 60 designates marks each comprising a narrow slit. The marks 60 are provided near the opposite ends of the same division 1a as those in the previously described embodiments, and are formed of a reflecting film which reflects light. Like the marks 41 of FIG. 5, the two marks 60 are such that the segment liking (the centers of) these marks is parallel to the direction of arrangement of the portions of the division 1a of the scale 1. The reference numeral 5 denotes a light receiving portion comprising two divided sensors 5a and 5b. The sensors 5a and 5b output signals conforming to the quantities of light independently entering them. The two sensors 5a and 5b are arranged in a direction orthogonal to the direction of arrangement of the portions of the division 1a of the scale 1. By a condensing lens 3, the mark 60 on the scale 1 is imaged on the two sensors 5a and 5b so that the center line of the image of the mark 60 coincides with the border line of the sensors 5a and 5b. The reference numeral 2 designates a light-emitting element, and the reference numeral 6 denotes a half-mirror.

The light-emitting element 2, the light receiving portion 5, the half-mirror 6 and the condensing lens 3 together constitute positional deviation detecting means, and these are integrated and contained in a case, not shown. This case is secured on a base plate, not shown.

In the present embodiment, part of the light beam from the light-emitting element 2 is reflected by the half-mirror 6 and is directed onto the mark 60 on the scale 1 by the condensing lens 3. The reflected light beam from the mark 60 is condensed by the condensing lens 3 and is passed through the half-mirror 6, whereafter it is caused to enter the light receiving portion 5 and the image of the mark 60 is formed on the sensors 5a and 5b.

Accordingly, the reflected light beams from the two marks 60 at the opposite ends of the scale 1 (the mark images) are successively received by the two sensors 5a and 5b, and during the detection of the marks, the inclination of the scale 1 is adjusted so that the output signals from the two sensors 5a and 5b become equal to each other, whereby the direction of arrangement of the portions of the division 1a of the scale 1 and the direction of movement A of the scale 1 (the movable stage) are made coincident with each other.

In the embodiments described above, the marks provided on the scale 1 may be constructed of a transmitting portion having its periphery shielded from light, instead of being formed of a reflecting film. Also, the marks may be constructed, for example, of a member having magnetism, instead of an optical member, and (the positions of) the marks may be read by magnetic detecting means.

In each of the embodiments described above, a mark or marks for alignment are provided on the scale, but without such a mark or marks being provided, the deviation of the direction of arrangement of the portions of the division relative to the direction of movement of the scale can still be detected. One method is to utilize, for example, the light-transmitting portions and light-intercepting portions constituting the division as a pattern replacing the mark or marks for alignment. Another method is to utilize the signal from detecting means for reading the division. The detecting means of this type produces a sine-wave-like pulse in response to the displacement of the scale, and the width of this pulse is determined in conformity with the pitch of the division in the direction of movement of the scale 1. Accordingly, if the division becomes inclined with respect to the direction of movement of the scale, this pulse width varies and therefore, the inclination of the scale can be detected on the basis of this pulse width. Consequently, the deviation of the direction of arrangement of the portions of the division relative to the direction of movement of the scale can be detected on the basis of the signal from this detecting means.

Figure 7:
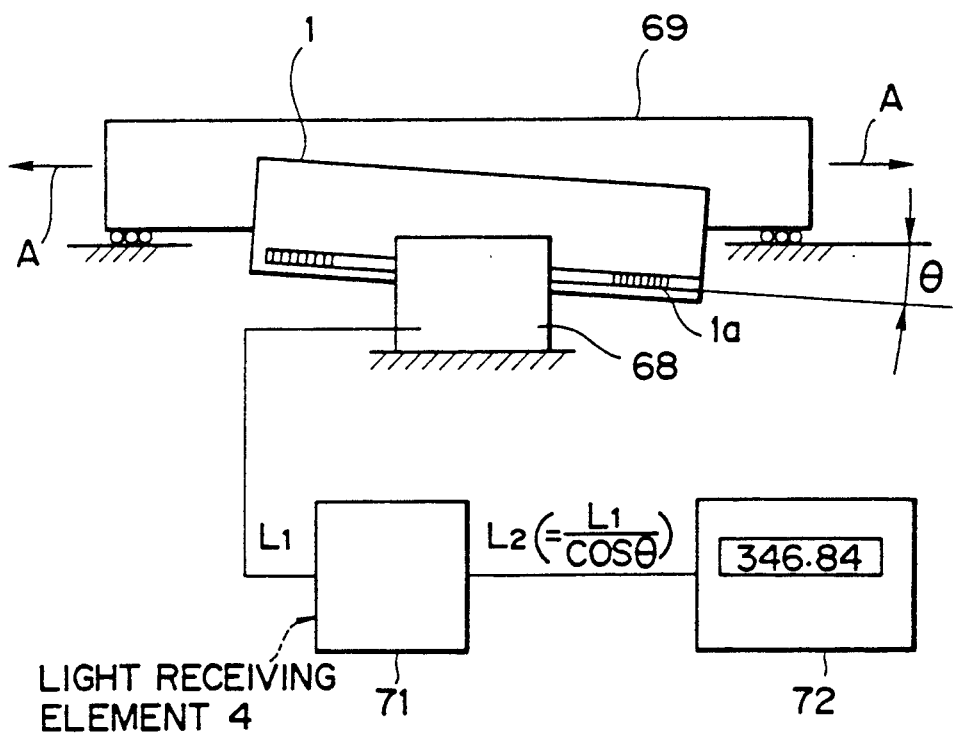
FIG. 7 is a schematic view showing still another embodiment of the present invention.

Of course, the position of the scale 1 can be adjusted on the basis of the deviation detected by said another method to thereby improve the measurement accuracy, and it is also possible to improve the measurement accuracy without adjusting the position of the scale. FIG. 7 shows such embodiment.

FIG. 7 is a schematic view showing still another embodiment of the present invention. In FIG. 7, the reference numeral 68 designates detecting means for reading the division 1a of the scale 1, the reference numeral 69 denotes a movable stage movable in the directions of arrows A, the reference numeral 71 designates a processing device for receiving a signal from (the light receiving element of) the detecting means 68 and processing it, and the reference numeral 72 denotes an indicator for indicating the amount of movement of the scale 1 (the movable stage 69) measured by the processing device 71.

The processing device 71 has the function of detecting the deviation of the direction of arrangement of the portions of the division 1a of the scale 1 relative to the direction of movement A of the stage 69 (the angle $\theta$ formed between the two directions) on the basis of the signal from the detecting means 68 by the method as described previously. As indicated by a broken line, the processing device 71 may be endowed with the function of calculating such deviation on the basis of the signal from the light receiving element 4 of the detecting means (2, 3, 4; 2, 3, 4, 5, 6) shown in FIGS. 4-6.

Here, if the angle $\theta$ between the direction of arrangement of the portions of the division of the scale and the direction of movement A of the stage is detected by the processing device 71, the amount of movement L1 read by the signal obtained from the detecting means 68 can be converted into L2 by the processing device 71 by the use of a conversion equation $L2 = L1/\cos\theta$, whereby the true amount of movement L2 of the scale 1 can be obtained easily and the correct amount of movement of the scale 1, i.e., the movable stage 69, can be indicated by the indicator 72 provided at the subsequent stage.

According to the apparatus of the present embodiment, the positional adjustment of the scale 1 is not effected and therefore, the setting time can be shortened. Also, as required, the angle $\theta$ may be periodically found to thereby automatically correct the influence thereof.

What is claimed is:

1. A displacement measuring apparatus for measuring the displacement of a scale, comprising:

a scale having dividing means formed thereon in a direction of the displacement for dividing the scale into measurable increments;

means for reading said dividing means on said scale to obtain displacement information of said scale;

detecting means for detecting an inclination of said dividing means relative to the direction of the displacement; and means for electrically correcting a signal from said reading means on the basis of a magnitude of the inclination of said dividing means detected by said detecting means.

2. An apparatus according to claim 1, wherein said reading means has means for directing a radiation beam to said dividing means, and means for receiving the beam from said dividing means and outputting a signal conforming to the displacement.

3. An apparatus according to claim 2, wherein said output means converts an interference fringe formed by a diffracted beam created by said dividing means into a signal.

4. An apparatus according to claim 1, wherein said detecting means detects a mark formed on said scale in a predetermined positional relationship with said dividing means and detects the inclination of said dividing means.

5. An apparatus according to claim 1, wherein said detecting means has means for directing a radiation beam to a mark formed on said scale in a predetermined positional relationship with said dividing means and means for receiving the beam modulated by the mark and outputting a signal conforming to the position of the mark.

6. A method of electrically correcting an inclination of a divided scale relative to a direction of displacement and measuring the displacement of the scale, comprising the steps of:

detecting an inclination of the divided scale relative to the direction of the displacement to form a first signal;

reading the divided scale to form a second signal having displacement information; and electrically correcting the second signal according to the first signal to measure the displacement of the scale on the basis of the corrected signal.

* * * * *

UNITED STATES PATENT AND TRADEMARK OFFICE
CERTIFICATE OF CORRECTION

PATENT NO. : 5,038,491

DATED : August 13, 1991

INVENTOR(S) : Masaaki Tsukiji, et al.

It is certified that error appears in the above-identified patent and that said Letters Patent is hereby corrected as shown below:

COLUMN 2:

Line 10, "$\eta$ should read --$\theta$--.

Line 21, "cron" should read --crons--.

COLUMN 5:

Line 26, "liking" should read --linking--.

Signed and Sealed this

Sixth Day of April, 1993

Attest:

STEPHEN G. KUNIN

*Attesting Officer*     Acting Commissioner of Patents and Trademarks